US006545598B1

(12) United States Patent
de Villeroche

(10) Patent No.: US 6,545,598 B1
(45) Date of Patent: Apr. 8, 2003

(54) MOTOR VEHICLE ACCESSORY COMPRISING A DATA DISPLAY SCREEN FOR THE DRIVER

(76) Inventor: Gérard Jodon de Villeroche, 6 avenue Saint Honoré d'Eylau, 75116, Paris (FR)

( * ) Notice: Subject to any disclaimer, the term of this patent is extended or adjusted under 35 U.S.C. 154(b) by 0 days.

(21) Appl. No.: 09/806,611
(22) PCT Filed: Sep. 29, 1999
(86) PCT No.: PCT/FR99/02311
 § 371 (c)(1),
 (2), (4) Date: Mar. 29, 2001
(87) PCT Pub. No.: WO00/18612
 PCT Pub. Date: Apr. 6, 2000

(30) Foreign Application Priority Data

Sep. 30, 1998 (FR) ............................................. 98 12240
Oct. 9, 1998 (FR) ............................................. 98 12697

(51) Int. Cl.⁷ ................................................. B60Q 1/00
(52) U.S. Cl. ........................ 340/438; 340/475; 359/630
(58) Field of Search ................................. 340/438, 435, 340/475, 996; 359/630

(56) References Cited

U.S. PATENT DOCUMENTS

| 1,895,560 | A | | 1/1933 | Weir |
| 1,895,566 | A | | 1/1933 | Bertell et al. |
| 4,943,796 | A | * | 7/1990 | Lee ............................. 340/435 |
| 5,475,366 | A | | 12/1995 | Van Lente et al. |
| 5,587,699 | A | * | 12/1996 | Faloon et al. ............... 340/475 |
| 5,631,638 | A | | 5/1997 | Kaspar |
| 5,708,410 | A | | 1/1998 | Blank |
| 5,878,353 | A | * | 3/1999 | Azam et al. ................ 455/550 |
| 5,898,392 | A | * | 4/1999 | Bambini et al. ........... 340/996 |
| 5,956,181 | A | * | 9/1999 | Lin ............................. 359/630 |
| 6,106,121 | A | * | 8/2000 | Buckley et al. ............. 359/839 |
| 6,142,656 | A | * | 11/2000 | Kurth ......................... 340/475 |

FOREIGN PATENT DOCUMENTS

| JP | 60 157 941 | 8/1985 |
| JP | 02 018130 | 1/1990 |
| JP | 08 216789 | 8/1996 |

* cited by examiner

Primary Examiner—John A. Tweel, Jr.
(74) Attorney, Agent, or Firm—Fulbright & Jaworski LLP

(57) ABSTRACT

An accessory for a motor vehicle, comprising a rear-view mirror case of either an inside or outside rear-view mirror, a screen attached to one side of the rear-view mirror case without disturbing vision in the rear-view mirror and means for adjusting the orientation of the screen with respect to the mirror. The mirror and the screen are simultaneously and fully visible to a driver of the vehicle. The rear-view mirror case, the screen housing, or both, comprise all or part of electronic elements to display at least one of the following functions on the screen: navigation, radar, map, guidance, traffic instruction.

19 Claims, 1 Drawing Sheet

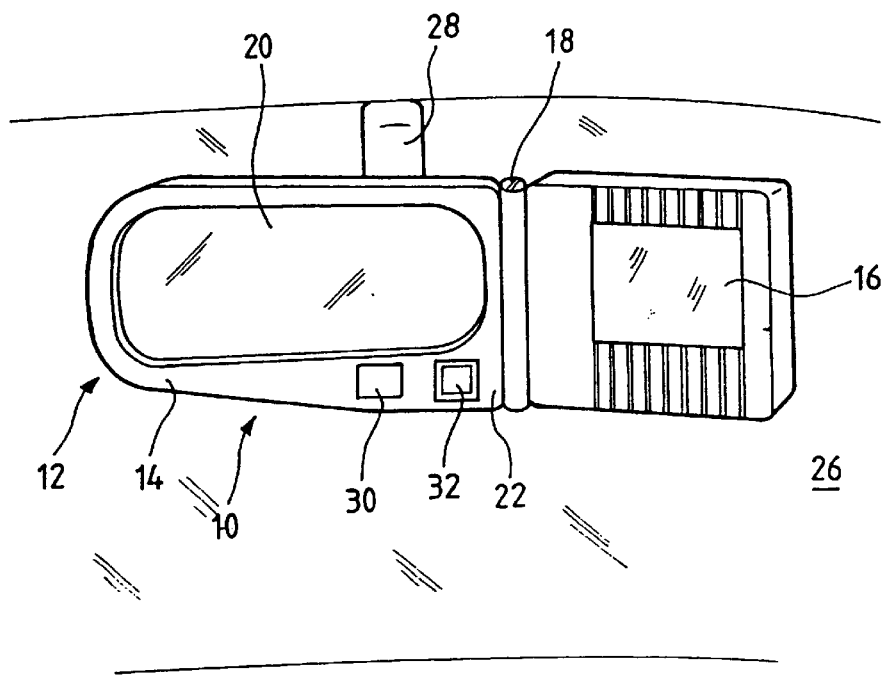
FIG_1
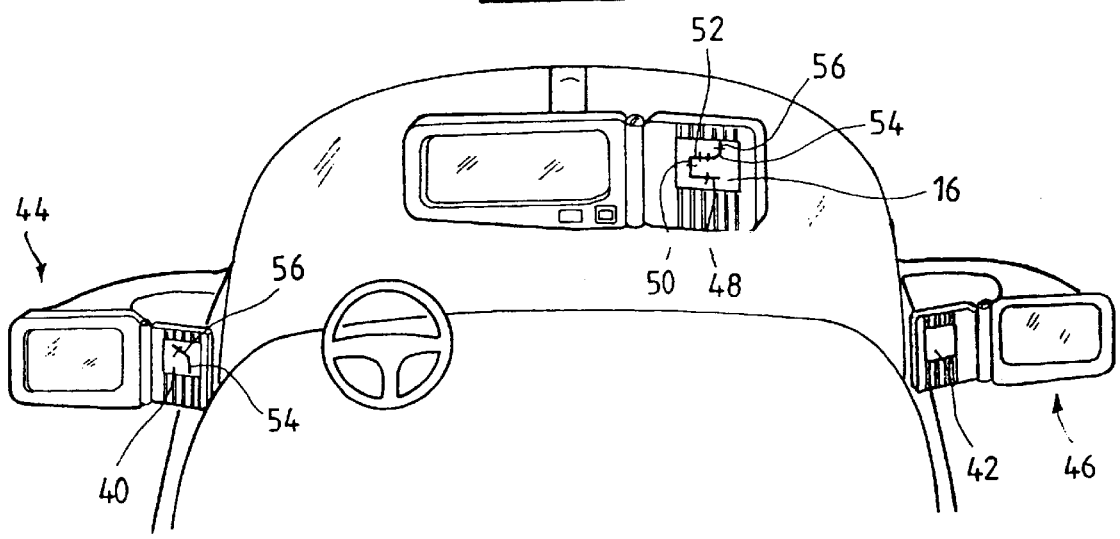
FIG_2

MOTOR VEHICLE ACCESSORY COMPRISING A DATA DISPLAY SCREEN FOR THE DRIVER

BACKGROUND OF THE INVENTION

The present invention relates to an accessory for a motor vehicle comprising a housing of an informative data display screen for the driver of the vehicle.

Presently, various types of screen devices exist, which provide useful informative data for driving and are intended to be installed on board a motor vehicle. The most common devices are the navigation apparatuses which display cartographic data and/or guidance informative data as maps or symbolic instructions.

A screen may also be used in other functions for viewing informative data relative to the density of traffic on the route of the vehicle. The screen may also be used, when visibility is reduced, for viewing obstacles located in front of the vehicle, whereby these obstacles are detected by a radar. Screens also exist, which show, through a camera, the road at the rear of the vehicle and thus facilitates driving in reverse gear.

These screens for the driver are the most often positioned on the dashboard, generally so as to be visible from the side of the driver's seat, or in the middle; these screens are in locations distinct from the locations where informative data for driving the vehicle such as speed, are located. These screens thus force the driver to look in a direction different from the directions towards which he must periodically turn his eyes such as the directions of one of the rear-view mirrors (there are generally three rear-view mirrors in a vehicle: one inside and one on each side) and of the speedometer. This layout is not favorable to driving safety.

On the other hand, a navigation apparatus has already been proposed, the screen of which has the function of a rear-view mirror in addition to its display role. But this device suffers from the drawback of impairing vision towards the rear when the screen is active; moreover, it is expensive to build.

SUMMARY AND OBJECTS OF THE PRESENT INVENTION

The invention finds a remedy to these drawbacks.

It is characterized in that the housing of the viewing device's screen is fixed, if necessary removably, to the case of an inside or outside rear-view mirror of the vehicle.

Thus, the screen may be watched at the same time as the rear-view mirror and it does not affect vision in the rear-view mirror. So the invention does not impair driving safety, as generally the driver should periodically take a look at the inside rear-view mirror and at the outside rear-view mirrors.

The invention thus provides a simple device which may be built economically and the use of which minimally distracts the driver's attention from his driving. When the screen housing is fixed to the case of the inside rear-view mirror and when the driver watches the screen, he retains complete vision of the road in the forward direction.

When a screen housing fixed to at least one of the cases of an outside rear-view mirror is used, this use may be combined with that of another screen housing fixed to the inside rear-view mirror.

In this case, the outside screen (or screens) provides for example the same informative data as the inside screen and forms so to speak a "repeater" of the inside screen. Therefore the outside screen (or screens) strictly needs not to be permanently active.

Thus, the right hand outside screen may be activated when the vehicle turns (or starts to turn) to the right and the left hand outside screen may be activated when the vehicle turns (or starts to turn) to the left. Activation of the screen is controlled, e.g. by maneuvering the turn signal switch or by a specific control, or even automatically by the program of a navigation apparatus.

Generally, activation of the outside screen (or screens) (whether they are used in combination with an inside screen or not) is performed manually or automatically, notably by a program.

The outside screen (or screens) may also provide different informative data from those provided by the inside screen. However, it is preferable that these informative data bear a relationship with one another, for example, the informative data on the outside screen (or screens) completing the informative data on the inside screen. Thus, for a navigation apparatus, in one embodiment, the inside screen provides general cartographic or graphical informative data referring to the itinerary and to the guidance, and an outside screen (or both of them) provides an indication or a specific instruction on the change of direction to be performed; the left hand outside screen shows an enlargement of the itinerary, shown in the direction of the vehicle, depicting an instruction for turning to the left and analogously, the right hand outside screen when the vehicle should turn to the right, shows an instruction for turning to the right. The scales of the inside screen and the outside screen (or screens) may be different, for example, the scale of the inside screen enables a portion of the route to be shown, whereas the scale of the outside screen is such that only the crossroad is shown, where the driver must change direction.

The housing of the screen may be fixed to any side of the case of the rear-view mirror. In the case of an outside rear-view mirror, the interior side or body side will preferably be selected; in this case, the screen does not impair visibility at all.

It is preferable that the screen be watched from the front, i.e., perpendicularly to its surface, notably when this screen is of the liquid crystal type. In this case, its plane has a different orientation from that of the rear-view mirror. This orientation may be adjustable, for example, by means of a double joint of the screen housing to the case of the rear-view mirror. The joint may be made with a ball-and-socket joint. Fixation of the screen housing to the case of the rear-view mirror may be performed by a clamping or nipping device called a clip fastener.

Viewing controls may be positioned on the housing of the inside screen or elsewhere in the passenger compartment.

In another embodiment, at least part of the viewing controls is located on the case of the inside rear-view mirror. In one example, a control unit is provided comprising a jointed handle, sometimes called a "joystick" which through its pivoting (upwards, downwards, to the right and to the left) enables a menu to be scrolled on the screen for selecting desired information and data, the actual control being achieved by pressing on the handle. Instead of pressing on the handle, the control may also be achieved by means of an additional button for entering data. Alternatively, the control may be achieved by means of a remote control box, for example of the infrared radiation type.

In the case of a navigation apparatus, for example with a microprocessor, a CDROM or DVDROM disk reader or a PCMCIA memory reader is provided. This reader may be firmly secured to the screen or located away from the latter, for example on the dashboard, in the glove compartment or in a car radio housing.

The connection of the screen to a reader and/or to the sensors (these sensors are: a speed sensor and a compass or a gyro, a GPS or DGPS sensor, in the case of a navigation apparatus, an information receiver on the density of traffic, a radar or a camera in the other cases) may be achieved by means of wire(s) passing through the unit for fixing the case of the rear-view mirror to the vehicle.

Generally, the device may include another portion and/or remote sensors of the rear-view mirror and, in this case, if the connection to this other portion and/or to the sensors is achieved through wire(s), this wire (or these wires) preferably passes through the unit for fixing the rear-view mirror to the vehicle.

Transmission of data to the screen (navigation or general information, traffic density, radar, camera data or other information) may be achieved without any wires, for example through infrared or HF transmission. For example, the infrared or HF transmitter is located on the flat edge of the dashboard and emits upwards in the direction of the rear-view mirror case and/or the screen housing.

The rear-view mirror case and/or the screen housing may contain the whole or a portion of the electronic components with the following functions: navigation, radar, camera, receiver, notably traffic information (RDS-TMC, for example), telephone receiver, in particular GSM receiver, memory card reader (for example credit cards), PCMCIA type card reader or data reader and processor for remote toll or remote payment cards, infrared or HF receiver, and television receiver.

It should be noted that when the rear-view mirror case or the screen housing which is fixed to it, contains an antenna, especially a GSM or GPS antenna, the position of this antenna at the front of the vehicle, near the windscreen, is favorable to reception.

When the screen housing is fixed to an outside rear-view mirror case, the positioning of an antenna outside the vehicle, notably a radar, radio, RDS, GPS, D-GPS antenna directed forwards, is more favorable to reception than an antenna positioned inside the vehicle.

The inside rear-view mirror case and/or the screen housing which is fixed to it, may contain a voice recognition device. Voice recognition is used for example in a navigation apparatus in order to indicate the place of destination.

In an embodiment relating to a navigation apparatus, navigation-related data are received by radio or by a GSM telephone. In this case, reception may be achieved in the same housing as that provided for the screen or in the(inside or outside) rear-view mirror case.

Thus, the housing fixed to the rear-view mirror and/or the rear-view mirror case provide the whole or a portion of the navigation system's functions listed above.

The inside rear-view mirror and the screen housing which is firmly secured to it, may be positioned at the level of the lower or upper portion of the windscreen.

The screen may comprise the viewing terminal common to a navigation apparatus, to a radar apparatus in the case of low visibility, to a receiver apparatus for traffic density information or to a camera apparatus as an aid for driving in reverse gear. This screen may also be used for viewing television broadcasts or video tape recordings or the like and for other uses described hereafter.

Another interesting use is the viewing of data relating to maintenance and repairs of the vehicle with the dates of the performed operations. For this purpose, data relating to these repairs and maintenance operations are written on a memory card, such as a magnetic or integrated circuit card, and the vehicle contains a reader for such a card, and the data are displayed on the screen. The reader may also be in the same housing as the one containing the screen. It may also be firmly secured to the inside rear-view mirror case.

According to yet another application, the inside or outside rear-view mirror case or the screen housing comprises a support for a remote toll or remote payment card. It is known that such a card includes data relating to its owner and an account which is assigned to him and when the vehicle passes in front of a remote toll terminal, a transmitter/receiver incorporated in this card enables data to be transferred towards the terminal in such a way that the owner's account is debited or units of account are deducted within the card itself. The screen may then be used for displaying data relating to the toll and to the owner's account, such as the toll charge or the value which remains assigned to the remote toll card. A remote payment card may also be used under the same conditions, for paying for fuel or paying for parking.

It should be noted that the invention is applied to any type of motor vehicle, whether it has two (for example a motorcycle), three or four wheels or more. It is also applied to nautical motor vehicles, such as speedboats. It is also applied to aircraft.

In an embodiment which may be used in combination with the configuration described above or independently of the latter (i.e., independently of the fixation of a screen housing to a rear-view mirror case), a navigation apparatus which provides a signal telling the driver that he should actuate his turn signal switch when the program of this apparatus has determined that the vehicle should turn to the left or to the right, is provided. This signal is for example, a light signal requiring, in one embodiment, the same diode or bulb as the one confirming that a change of direction should be undertaken. It may also be a sound signal requiring, in one embodiment, the same sound generator as the one confirming a change of direction. In an alternative embodiment, it is the turn signal switch which is automatically actuated by the program of the navigation apparatus. Thus, the driver has an additional instruction or aid on the action to be undertaken; even if the turn signal switch is actuated automatically, the driver may manually confirm the maneuver of this signal switch and this signal switch may then resume its manual operation.

Thus, in the case of a navigation apparatus, the invention provides a set of informative data which increases driving safety. For example, in the event of a change of direction, the navigation apparatus first provides sound (for example "turn to the right") and/or visual informative data before this change of direction, sufficiently early with respect to the action to be undertaken, for example fifty meters before the bend in the city and 500 meters to one kilometer on a road. Subsequently, these informative data are confirmed upon approaching the bend to be taken, by a cartographic instruction on the inside screen and/or an outside screen. The driver, already warned by the sound and/or visual informative data about the next change of direction, when he starts to undertake this change of direction, should—as prompted by the highway code—take a look at the inside rear-view mirror and at the outside rear-view mirror located on the side towards which he should be turning. Under these conditions, if a screen is firmly secured to this outside rear-view mirror, the bend which he should be taking, is confirmed on this screen.

The present invention thus provides an accessory for a motor vehicle, which comprises an inside or outside rear-view mirror case and a screen housing for the data display device intended for the driver of the vehicle, wherein the screen housing is fixed, for example removably, to the case of the rear-view mirror in such a way that this screen housing does not affect vision in the mirror of the rear-view mirror, and the rear-view mirror and screen are visible simultaneously, and in that the accessory additionally includes means, e.g. with a joint or a ball-and-socket joint, for adjusting the orientation of the surface of the screen with respect to the surface of the mirror of the rear-view mirror.

According to an embodiment, the accessory comprises means for controlling the viewing, which are firmly secured to the rear-view mirror case or the screen housing.

According to an embodiment, the control means comprise a unit which through its pivoting enables a menu to be scrolled, whereby data selection is performed by pressing on this unit or by actuating another control unit.

According to an embodiment, the accessory comprises another portion and/or sensors located away from the rear-view mirror and the connection to the other portion and/or to the sensors is achieved either through a wireless connection or through wire(s) passing through the fixation of the rear-view mirror case.

According to an embodiment, the screen housing and/or the rear-view mirror case comprise the whole or a portion of the electronic components providing one or more of the following functions intended to be viewed on the screen: navigation, radar, camera, radio receiver, telephone receiver, data reader and/or processor for memory cards or disks, for cartographic data, general information or vehicle repair or maintenance data or payment data, notably remote payment data, infrared or HF receiver, television receiver.

According to an embodiment, the screen housing and/or the inside rear-view mirror case comprise voice recognition means.

The invention additionally provides a screen device for displaying informative data for the driver of a motor vehicle, wherein this screen housing may be fixed to the rear-view mirror case of the vehicle, in such a way that it does not affect vision in the rear-view mirror and that the mirror and the screen are visible at the same time and the device comprises means for adjusting the orientation of the surface of the screen with respect to the mirror surface of the rear-view mirror.

According to an embodiment, the fixation of the screen housing to the case of the rear-view mirror is removable.

According to an embodiment, the screen housing may be fixed to the rear-view mirror case through clamping and be jointed to the latter.

According to an embodiment, the device comprises:
 a first screen housing which may be fixed to the case of an inside rear-view mirror, and
 at least a second screen housing which may be fixed to an outside rear-view mirror case, wherein the screen of the second screen housing is able to display the same informative data or other informative data which complete informative data displayed on the screen of the first screen housing.

According to an embodiment, the device comprises means for controlling display of informative data on the outside screen in such a way that this display only operates under the control of a navigation apparatus when the informative data concern the side on which the outside rear-view mirror case is located.

BRIEF DESCRIPTION OF THE DRAWINGS

Other features and advantages of the invention will become apparent with the description of certain of its embodiments, the latter being made with reference to the appended drawings wherein:

FIG. 1 is a perspective illustration of an accessory including an inside rear-view mirror and a screen according to the invention, and FIG. 2 is a drawing of a set of three accessories including an inside screen and two outside screens according to the invention.

DETAILED DESCRIPTION OF THE EMBODIMENTS

In the example illustrated in FIG. 1, the accessory 10 is installed in a right-hand drive vehicle, the wheel (not shown) is thus positioned on the left of the vehicle. This accessory 10 includes an inside rear-view mirror 12 with a general rectangular shape on the one hand, and on the other hand, a data display screen housing 16 for a navigation system, jointed to the case 14 of the rear-view mirror 12, on its right hand vertical side. This screen may also be used for other purposes, as described above.

As a navigation system is well known today, it will not be described in detail. Only as a reminder, a map and guidance instructions may appear on screen 16, generally as a cartographic chart, as easily understood symbols or pictures which enable the driver to determine the route to be taken when he must change direction. Generally, for guidance, the navigation apparatus provides stepwise informative data, bend after bend, relating to the successive actions to be undertaken. The cartographic indicative data may be illustrated either conventionally with the map pointing to the North or, more practically, pointing along the direction of the followed route.

In the example, the required cartographic data are stored on a disk, such as a CDROM or a DVDROM or on a PCMCIA type memory card. In both cases, a reader (not shown) is provided which is located on the dashboard. As an alternative (not shown), the reader is located in the same housing as the screen 16 or in the case of the rear-view mirror.

In another embodiment, the cartographic data are received by a radio receiver or a telephone, notably of the GSM type. In this case, the radio receiver or the GSM receiver may be housed in the same housing as screen 16 or in case 14.

The screen housing 16 has a general shape corresponding to the shapes and dimensions of the screen. The joint 18 of this screen housing 16 to the case 14 of the rear-view mirror 12 enables the screen to have an orientation independent of the orientation of the mirror 20 of rear-view mirror 12. The joint 18 is along a vertical axis near the right hand vertical edge 22 of the case 14 of the rear-view mirror 12. Another joint (not shown) may also be provided along a horizontal axis, for example in the middle of side 22, or even a ball-and-socket joint firmly secured to the rear-view mirror and the screen housing. Thus, the screen 16 has any orientation with respect to the orientation of mirror 20. A junction of both case and housing by clamping means, sometimes called clip fastening means, may also be provided.

By adjusting the orientation of screen 16, the normal to the plane of this screen may be directed towards the driver, which provides the best results in luminosity and in colors when dealing with a screen of the liquid crystal type.

Although, in the example, the screen is jointed on the right hand side (passenger side) of the case of the inside rear-view mirror, it is understood that screen 16 may be jointed to any side of case 14. In other words, screen 16 may equally be jointed on the left hand side, on the upper side or on the lower side of case 14.

In the example illustrated in FIG. 1, the rear-view mirror 12 is located in the vicinity of the upper portion of the wind screen 26 and it is fixed to the windscreen or to the vehicle's ceiling through an arm 28. This arm 28 houses the wires (not shown) which connect the screen to the reader.

If the reader is located in the same housing as the screen 16, arm 28 houses the wires for connecting the speed sensor and a compass or a gyro, as well as a GPS or DGPS detector.

Alternatively, data displayed on the screen are received by a receiver, housed in the same housing as screen 16, or in the rear-view mirror case, through wireless transmission, notably high frequency (HF) or infrared transmission.

When the data are received by radio or GSM telephone, the receiver for these data may be located in the rear-view mirror case or in the screen housing.

The front face of case 14 of rear-view mirror 12 has a control unit 32 of the "joystick" type which through its pivoting around an axis (not shown), enables a menu to be scrolled on the screen in order to select desired information or data on the one hand, and on the other hand, a button 30 for data input.

In another embodiment, unit 32 is pressed for inputting data which have been selected by pivoting this unit.

As an alternative (not shown), the controls are located on the dashboard, on the wheel or on e.g. an infrared remote control device.

In an embodiment, screen housing 16 is removable from rear-view mirror 12, which provides safety against theft and allows it to be optionally used outside the vehicle.

In an alternative embodiment (not shown), selection and control means 32 and optionally 30 are located on the case of screen 16. This embodiment is particularly useful when practically all the required electronic modules for navigation (and/or other functions) are located in the screen housing 16. In this case, we are dealing with a device which may be autonomous, but which is provided with fixation means to the case of the rear-view mirror.

The screen of the navigation apparatus may not only provide cartographic and guidance informative data, but also informative data on the density of traffic in the area where the vehicle is located, for example these informative data are provided by radio. The screen may also be used for assisting the driver in the case of bad visibility, whereby a radar is provided for detecting obstacles. The screen may also be used for driving in reverse gear, whereby a camera is now provided for viewing the road at the rear of the vehicle. The screen may also be used for displaying general informative data such as informative data issued from an Internet type network or from a memory.

The same inside screen may also be used for displaying all these functions. It may also be used for other functions such as viewing (for the passengers), television broadcasts or video tape recordings.

Alternatively, the inside rear-view mirror and the screen which is attached to it are fixed on the dashboard.

The case of the rear-view mirror or the screen housing 16 may include an "on/off" button. Alternatively, starting and stopping the accessory or the device is controlled by the ignition key of the vehicle.

A loudspeaker may also be incorporated into the housing of screen 16 or into the case of the inside rear-view mirror, whereby this loudspeaker provides informative data or guidance instructions in the case of a navigation apparatus.

In the embodiment illustrated in FIG. 2, three screens are provided, i.e. a screen 16, the housing of which is firmly secured to the case of the inside rear-view mirror, and two outside screens referenced as 40 and 42, respectively. Of course, FIG. 2 is schematic; for example the inside rear-view mirror of screen 16 has been illustrated, enlarged with respect to the dimensions of the windscreen; also, orientation of screens 40 and 42 do not necessarily correspond to normal use, as these screens should be orientated so as to be visible to the driver.

The housing of screen 40 is fixed to the case of the left hand outside rear-view mirror 44, whereas the housing of screen 42 is fixed to the case of the right hand outside rear-view mirror 46. The housing of screen 40 is fixed on the side of the case of the left hand rear-view mirror, which is turned towards the vehicle, i.e. on its right hand side, whereas the housing of screen 42 is fixed on the left hand side of the case of right hand rear-view mirror 46.

In this example, a navigation apparatus is provided, the reader of which (not shown) is fixed either to screen housing 16, or to the inside rear-view mirror case, or in another location in the vehicle; this apparatus controls the displays on the three screens 16, 40 and 42.

This display control is such that cartographic informative data are provided on screen 16, showing the portion of the followed itinerary and the portion of this itinerary which should be taken after having changed direction, i.e. after having turned to the left in the illustrated example.

On the other hand, specific indications or instructions on the actions to be undertaken are displayed on screens 40 and 42. Through a map enlargement on screen 40, it is shown that a left turn must be performed which confirms the indication provided on screen 16. In this case, screen 42 is either off or providing other informative data. When this situation occurs, screen 42 provides an indication or an instruction for turning to the right.

On screen 16, a route with several sections 48, 50, 52, 54, 56 and has been illustrated. The vehicle located in section 54, must then take section 56 and for this purpose, must turn to the left. Under these conditions, screen 14 illustrates at an enlarged scale, the itinerary with the followed section 54 and the next section 56 to be followed. The itinerary to be followed, illustrated on the screen, is marked for example with a particular color for the route to be followed, so as to be readily understood.

The control for screens 16, 40 and 42 is located for example inside the vehicle. Screens 40 and 42 are not necessarily activated permanently. For example, these screens are automatically activated (alternately according to whether a left or right turn is to be performed) by the program of the navigation apparatus when they are to display an instruction for changing direction.

Whatever the embodiment, maximum driving security is provided by the invention, as the driver may simultaneously observe both the traffic at the rear of the vehicle and the guidance informative data (or other informative data) without losing sight of the road or the route which he is following and this assists him in observing the highway code.

The accessory or the device according to the invention may be described as "smart rear-view mirrors".

What is claimed is:

1. An accessory for a motor vehicle, comprising:
   a rear-view mirror case of either an inside or outside rear-view mirror;

a screen housing of a data display device of the liquid crystal type, wherein the screen housing is attached to one side of the rear-view mirror case without disturbing vision in the mirror of the rear-view mirror case, and wherein the mirror of the rear-view mirror case and the screen of the data display device are simultaneously and fully visible to a driver of the vehicle; and means for adjusting the orientation of the surface of the screen with respect to the surface of the mirror of the rear-view mirror case in order that the driver can observe the liquid crystal screen perpendicularly to its surface;

wherein the screen is adapted to the display of navigation or guidance information;

and wherein the rear-view mirror case, the screen housing, or both, comprise all or part of electronic elements providing one or several of the following functions to be displayed on the screen: navigation, radar, map, guidance, traffic instruction.

2. The accessory of claim 1, wherein the screen is articulated to the upper side of the inside rear-view mirror case.

3. The accessory according to claim 1, wherein the means for adjusting the orientation of the surface of the screen with respect to the surface of the rear-view mirror comprise a double hinged connection or a ball and socket joint.

4. The accessory according to claim 1, comprising a clamping or a nipping device for the fixation of the screen housing to the case of the rear-view mirror.

5. The accessory according to claim 1, further comprising another part of electronic elements, sensors, or both, which are remote from the rear-view mirror, wherein the connection to said other part, said sensors, or both, is wireless or with a wire passing through the fixation to the case of the rear-view mirror.

6. The accessory according to claim 1, wherein the housing of the screen the case of the rear-view mirror, or both, comprise all or part of the electronic elements which provide one or several of the following functions to be displayed on the screen: video-camera, radio receiver, telephone receiver, reader and/or data processing for memory cards or discs for cartographic data, general information or data related to the repair or maintenance of the vehicle or payment data, remote payment, infrared or HF receiver, antennas and internet receiver.

7. The accessory according to claim 1, wherein the inside screen housing, the inside rear-view mirror case, or both, comprise voice recognition means.

8. The accessory according to claim 1, wherein the inside screen housing, the inside rear-view mirror case, or both, comprise a loud speaker.

9. The accessory according to claim 1, further comprising:
a navigation apparatus;
an inside screen housing of an inside screen, this inside screen housing being attached to an inside rear-view mirror case;
an outside screen housing of an outside screen, the outside screen housing being attached to an outside rear-view mirror case; and
means for controlling display of information on the inside and outside screens, such that information on the inside and outside screens are the same or are complementary.

10. The accessory according to claim 9, wherein the navigation apparatus is operable to control the display of information on the outside screen in such a way that guidance information displayed on this screen concerns the side of the vehicle where this outside screen is situated.

11. The accessory according to claim 1, further comprising control means for controlling the viewing on the screen, the control means being secured to the rear-view mirror case or the screen housing.

12. The accessory according to claim 11, wherein the control means comprise a control unit operable to scroll a menu on the screen, and wherein data selection is performed by pressing on the control unit or by actuating another control unit.

13. The accessory according to claim 1, wherein data relating to navigation are transmitted to the data display device via radio, mobile telephone or infrared.

14. A display device with a screen for the display of information for the driver of a vehicle, wherein the screen is adapted to display information relating to navigation or guidance, and is of the liquid crystal type, and wherein the screen housing comprises means for fixing this housing to one side of an inside or outside rear-view mirror of the vehicle, these fixation means being such that, when the housing is fixed to one side of the rear-view mirror case, this housing does not disturb the vision in the mirror and the mirror and the screen are simultaneously and fully visible to a driver, the fixation means being such that they allow the adjustment of the orientation of the surface of the screen with respect to the surface of the mirror in such a way that the driver can observe the liquid crystal screen perpendicularly to its surface.

15. The device according to claim 14, wherein the means for adjusting the orientation of the surface of the screen with respect to the surface of the rear-view mirror comprise a double hinged connection or a ball and socket joint.

16. The device according to claim 14, wherein the fixation means comprise a clamping device or a nipping device.

17. The device according to claim 14, wherein the housing of the screen comprise all or part of the electronic elements which provide one or several of the following functions to be displayed on the screen: navigation, radar, map, guidance, traffic instruction, video-camera, radio receiver, telephone receiver, reader or data processing for memory cards or discs for cartographic data, general information or data related to the repair or maintenance of the vehicle or payment data, remote payment, infrared or HF receiver, antennas, internet receiver.

18. The device according to claim 14, comprising a first screen housing comprising means for fixing this housing to an inside rear-view mirror case, and at least a second screen housing comprising means for fixing this housing to an outside rear-view mirror case.

19. The device according to claim 18, comprising means to display information on the second screen only when this information relates to the side of the vehicle where the outside rear-view mirror case is situated.

* * * * *